United States Patent
Ueda et al.

(10) Patent No.: US 10,128,474 B2
(45) Date of Patent: Nov. 13, 2018

(54) CELL MODULE AND CELL PACK

(71) Applicant: KABUSHIKI KAISHA TOYOTA JIDOSHOKKI, Aichi-ken (JP)

(72) Inventors: Hiromi Ueda, Kariya (JP); Takahisa Sugimoto, Kariya (JP); Shintaro Watanabe, Kariya (JP); Hidefumi Oishi, Kariya (JP); Takashi Sakai, Kariya (JP); Naoto Morisaku, Kariya (JP); Kazuki Maeda, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 378 days.

(21) Appl. No.: 14/431,844

(22) PCT Filed: Sep. 20, 2013

(86) PCT No.: PCT/JP2013/075543
§ 371 (c)(1),
(2) Date: Mar. 27, 2015

(87) PCT Pub. No.: WO2014/054445
PCT Pub. Date: Apr. 10, 2014

(65) Prior Publication Data
US 2015/0249239 A1    Sep. 3, 2015

(30) Foreign Application Priority Data
Oct. 4, 2012 (JP) ................................ 2012-222325

(51) Int. Cl.
*H01M 2/24* (2006.01)
*H01M 2/10* (2006.01)

(52) U.S. Cl.
CPC ...... *H01M 2/1077* (2013.01); *H01M 2220/20* (2013.01)

(58) Field of Classification Search
None
See application file for complete search history.

(56) References Cited

U.S. PATENT DOCUMENTS

2002/0179552 A1    12/2002  Marraffa
2003/0054240 A1*    3/2003  Aronsson ............ H01M 2/1077
                                                           429/157
(Continued)

FOREIGN PATENT DOCUMENTS

JP    2005-285452    10/2005
JP    2010-503970     2/2010
(Continued)

OTHER PUBLICATIONS

International Search report in PCT/JP2013/075543, dated Nov. 26, 2013.
(Continued)

Primary Examiner — Tracy M Dove
(74) Attorney, Agent, or Firm — Greenblum & Bernstein, P.L.C.

(57) ABSTRACT

A battery module includes a first battery stack, a second battery stack, a first bracket, and a second bracket. The first and second battery stacks each have a plurality of rechargeable batteries. The first battery stack has an end adjacent to the second battery stack, and the second battery stack has an end adjacent to the first battery stack. The first bracket is provided at the end of the first battery stack. The second bracket is provided at the end of the second battery stack and has the same shape as the first bracket. Each of the first bracket and the second bracket has insertion protrusions and receiving recesses that are alternately arranged. One of the insertion protrusions of the second bracket is inserted into the receiving recess formed between adjacent two of the insertion protrusions of the first bracket.

13 Claims, 4 Drawing Sheets

(56) References Cited

U.S. PATENT DOCUMENTS

| | | | | |
|---|---|---|---|---|
| 2004/0142238 A1* | 7/2004 | Asahina | ............... | B60L 3/0046 |
| | | | | 429/176 |
| 2006/0246348 A1* | 11/2006 | Hamada | .............. | H01M 2/1072 |
| | | | | 429/148 |
| 2010/0151299 A1 | 6/2010 | Ha et al. | | |
| 2013/0017436 A1* | 1/2013 | Kume | ................... | H01M 2/206 |
| | | | | 429/159 |

FOREIGN PATENT DOCUMENTS

| | | |
|---|---|---|
| JP | 2010-129860 | 6/2010 |
| JP | 2010-225337 | 10/2010 |
| JP | 2012-79511 | 4/2012 |

OTHER PUBLICATIONS

International Preliminary Report on Patentability in PCT/JP2013/075543, dated Apr. 7, 2015.

* cited by examiner

CELL MODULE AND CELL PACK

TECHNICAL FIELD

The present disclosure relates to a battery module, which includes a first battery stack and a second battery stack, and a battery pack.

BACKGROUND ART

Patent Document 1 describes an example of a known battery module that includes a plurality of battery stacks.

The battery module of Patent Document 1 is installed in an electric vehicle or a hybrid vehicle. The battery module includes a plurality of battery stacks accommodated in a packaging case. The battery stacks are arranged in the row direction and the column direction to form a matrix in the packaging case. The battery stack is a package of a plurality of aligned cells.

PRIOR ART DOCUMENT

Patent Document

Patent Document 1: Japanese Laid-Open Patent Publication No. 2012-79511

SUMMARY OF THE INVENTION

Problems that the Invention is to Solve

In a battery module, it is desirable to limit positional deviation of the battery stacks accommodated in the packaging case. In addition, a smaller battery module is desired since the battery module may be installed in a limited accommodation space.

It is an object of the present disclosure to provide a battery module and a battery pack that limit positional deviation of battery stacks and are reduced in size.

Means for Solving the Problems

To achieve the foregoing objective, a battery module includes a first battery stack, a second battery stack, a first bracket, and a second bracket. The first battery stack and the second battery stack each include a plurality of rechargeable batteries. The first battery stack includes an end that is adjacent to the second battery stack, and the second battery stack includes an end that is adjacent to the first battery stack. The first bracket is located at the end of the first battery stack. The second bracket is located at the end of the second battery stack and identical in shape with the first bracket. Each of the first bracket and the second bracket includes insertion protrusions and reception recesses that are arranged alternately. One of the insertion protrusions of the second bracket is inserted into one of the reception recesses that is formed between two adjacent ones of the insertion protrusions of the first bracket.

MODES FOR CARRYING OUT THE INVENTION

Figure 1:
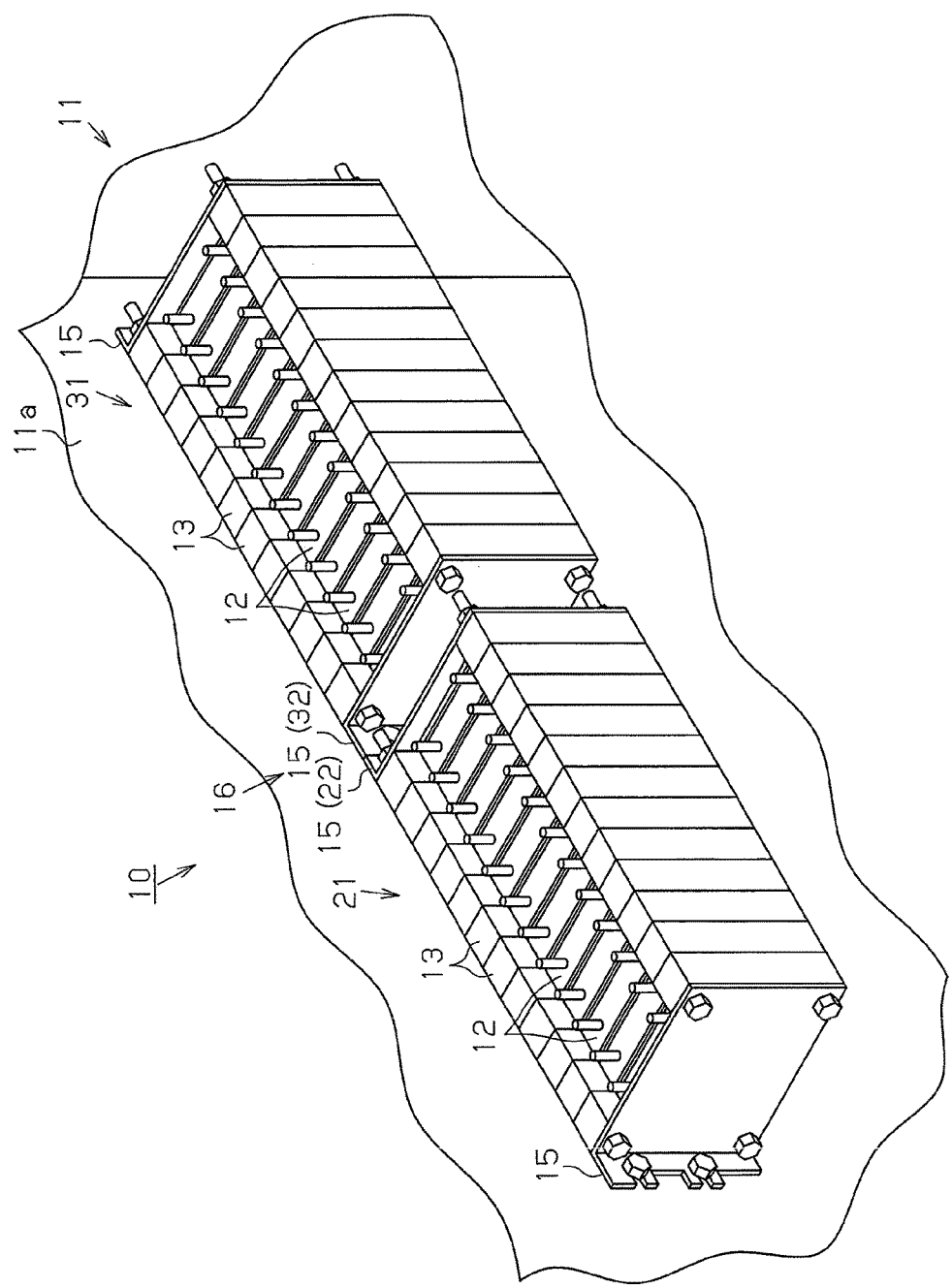
FIG. 1 is a perspective view showing a battery pack of one embodiment.

Referring to FIG. 1, a battery pack of one embodiment will now be described.

As shown in FIG. 1, a battery pack 10 includes a housing 11, which serves as a coupled member, and a battery module 16, which is coupled to an inner surface 11a of the housing 11. The battery module 16 includes a first battery stack 21 and a second battery stack 31, which are arranged in a line. Each of the first battery stack 21 and the second battery stack 31 is formed by arranging a plurality of rectangular batteries 12 in the thickness direction of the rectangular batteries 12. The rectangular batteries 12 are rechargeable batteries (such as lithium-ion rechargeable batteries and nickel metal hydride batteries) and held by battery holders 13. A bracket 15 is arranged at either end of each of the first battery stack 21 and the second battery stack 31 in the arrangement direction of the rectangular batteries 12. The brackets 15 of the present embodiment are identical in shape.

Figure 2:
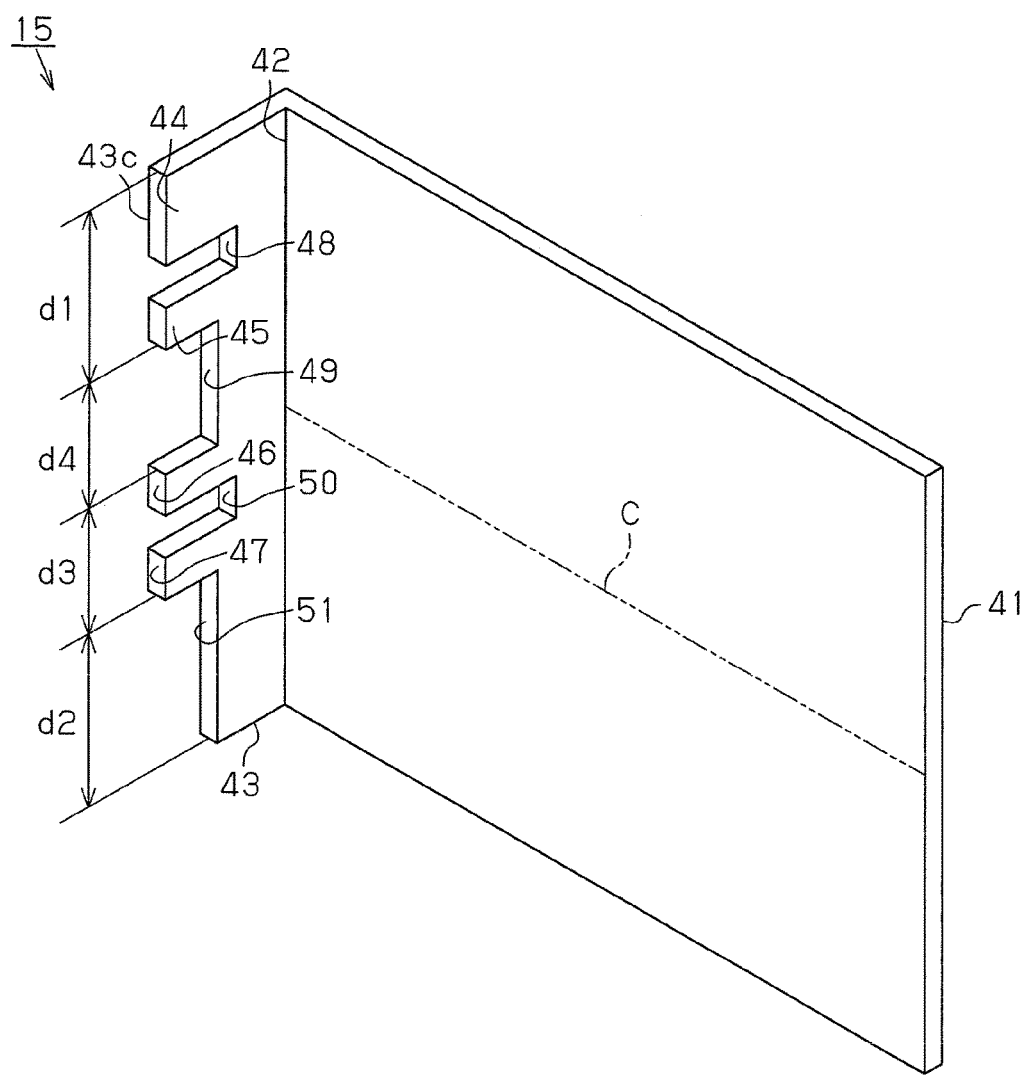
FIG. 2 is a perspective view showing a first bracket and a second bracket of the battery pack of FIG. 1.

As shown in FIG. 2, each bracket 15 includes a fixing portion 41, which has the shape of a rectangular flat plate, and a planar fastening portion 43, which extends from a first longitudinal end 42 of the fixing portion 41 in the thickness direction of the fixing portion 41. In the fastening portion 43, the direction extending in the thickness direction of the fixing portion 41 is referred to as a transverse direction, and the direction perpendicular to the transverse direction is referred to as a longitudinal direction. The fastening portion 43 includes a first end 43c in the transverse direction that is opposite to the fixing portion 41 in the transverse direction. The first end 43c includes a plurality of (four in the present embodiment) protrusions that extend in the transverse direction, namely, first to fourth protrusions 44 to 47, and a plurality of (four in the present embodiment) recesses that extend in the transverse direction, namely, first to fourth recesses 48 to 51. The protrusions 44 to 47 and the recesses 48 to 51 are arranged alternately. Specifically, the first protrusion 44, the first recess 48, the second protrusion 45, the second recess 49, the third protrusion 46, the third recess 50, the fourth protrusion 47, and the fourth recess 51 are arranged in this order in the longitudinal direction of the fastening portion 43. In the longitudinal direction of the fastening portion 43, a dimension d1 between the end of the first protrusion 44 that is opposite to the first recess 48 and the end of the second protrusion 45 that faces the second recess 49 is substantially equal to a dimension d2 of the fourth recess 51. Further, in the longitudinal direction of the fastening portion 43, a dimension d3 between the end of the third protrusion 46 that faces the second recess 49 and the end of the fourth protrusion 47 that faces the fourth recess 51 is substantially equal to a dimension d4 of the second recess 49. The transverse direction and the longitudinal direction of the fixing portion 41 differ from the transverse direction and the longitudinal direction of the fastening portion 43.

Figure 3:
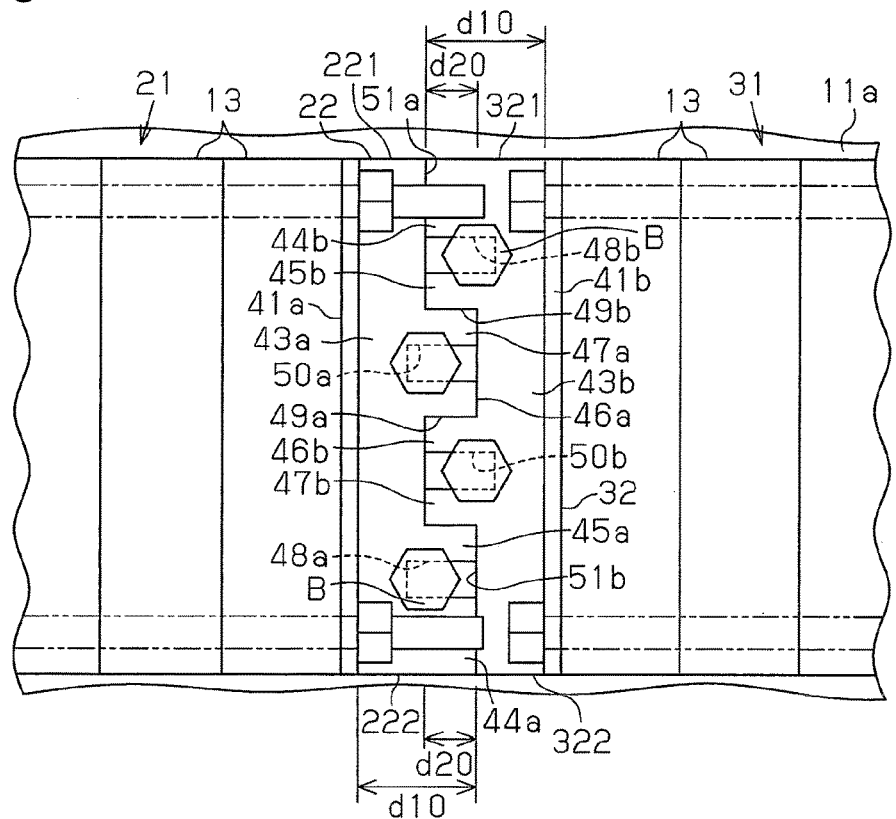
FIG. 3 is an enlarged view showing the first bracket and the second bracket of the battery pack of FIG. 1.

Referring to FIG. 3, the bracket 15 that is located at the end of the first battery stack 21 adjacent to the second battery stack 31 is referred to as a first bracket 22. Further, the bracket 15 that is located at the end of the second battery stack 31 adjacent to the first battery stack 21 is referred to as a second bracket 32. The sections of the first bracket 22 are indicated by the reference numerals of the sections of the bracket 15 of FIG. 2 that are suffixed with "a". The sections of the second bracket 32 are indicated by the reference numerals of the sections of the bracket 15 of FIG. 2 that are suffixed with "b".

The first bracket 22 and the second bracket 32 are fixed to be rotated from one another by 180 degrees on the rotation axis that is a center axis C connecting the center points of the two longitudinal end edges of the fixing portions 41 (41a and 41b). Thus, the orders of the protrusions and recesses of the first bracket 22 and the second bracket 32 in one direction are opposite to one another. For example, in the first bracket 22, from the upper side as viewed in FIG. 3, the fourth recess 51a, the fourth protrusion 47a, the third recess 50a, the third protrusion 46a, the second recess 49a, the second protrusion 45a, the first recess 48a, and the first protrusion 44a are arranged in this order, such that a recess is located at the upper end.

In contrast, in the second bracket 32, from the upper side as viewed in FIG. 3, the first protrusion 44b, the first recess 48b, the second protrusion 45b, the second recess 49b, the third protrusion 46b, the third recess 50b, the fourth protrusion 47b, and the fourth recess 51b are arranged in this order, such that a protrusion is located at the upper end.

The fastening portion 43a of the first bracket 22 includes a first longitudinal end 221 (a secondary end) and a second longitudinal end 222 (a primary end). The first longitudinal end 221 includes the fourth recess 51a, and the second longitudinal end 222 includes the first protrusion 44a. The fastening portion 43b of the second bracket 32 includes a first longitudinal end 321 (a primary end) and a second longitudinal end 322 (a secondary end). The first longitudinal end 321 includes the first protrusion 44b, and the second longitudinal end 322 includes the fourth recess 51b.

The first bracket 22 includes the fixing portion 41a fixed to the first battery stack 21. The second bracket 32 includes the fixing portion 41b fixed to the second battery stack 31. The fastening portion 43a of the first bracket 22 and the fastening portion 43b of the second bracket 32 are adjacent to one another.

The first protrusion 44a and the second protrusion 45a of the first bracket 22 are inserted into the fourth recess 51b of the second bracket 32. The set of the first protrusion 44a and the second protrusion 45a of the first bracket 22 functions as a single insertion protrusion, while the fourth recess 51b of the second bracket 32 functions as a reception recess into which the single insertion protrusion is inserted. The third protrusion 46a and the fourth protrusion 47a of the first bracket 22 are inserted into the second recess 49b of the second bracket 32. The set of the third protrusion 46a and the fourth protrusion 47a of the first bracket 22 functions as a single insertion protrusion, while the second recess 49b of the second bracket 32 functions as a reception recess into which the single insertion protrusion is inserted.

Similarly, the first protrusion 44b and the second protrusion 45b of the second bracket 32 are inserted into the fourth recess 51a of the first bracket 22. The set of the first protrusion 44b and the second protrusion 45b of the second bracket 32 functions as a single insertion protrusion, while the fourth recess 51a of the first bracket 22 functions as a reception recess into which the single insertion protrusion is inserted. The third protrusion 46b and the fourth protrusion 47b of the second bracket 32 are inserted into the second recess 49a of the first bracket 22. The set of the third protrusion 46b and the fourth protrusion 47b of the second bracket 32 functions as a single insertion protrusion, while the second recess 49a of the first bracket 22 functions as a reception recess into which the single insertion protrusion is inserted.

The first recess 48a and the third recess 50a of the first bracket 22 receive none of the first to fourth protrusions 44b to 47b. The first recess 48b and the third recess 50b of the second bracket 32 receive none of the first to fourth protrusions 44a to 47a. The first recesses 48a and 48b and the third recesses 50a and 50b each function as a fastening recess. A bolt B, which serves as a fastener, is inserted into each of the first recesses 48a and 48b and the third recesses 50a and 50b and threaded to the housing 11 to fix the first battery stack 21 and the second battery stack 31 to the housing 11.

As described above, the set of the first protrusion 44a and the second protrusion 45a of the first bracket 22, which functions as a single insertion protrusion, is inserted into the fourth recess 51b of the second bracket 32. The set of the third protrusion 46a and the fourth protrusion 47a of the first bracket 22, which functions as a single insertion protrusion, is inserted into the second recess 49b of the second bracket 32. That is, the first protrusion 44a and the second protrusion 45a of the first bracket 22 are inserted into the same recess (the fourth recess 51b of the second bracket 32), and the third protrusion 46a and the fourth protrusion 47a of the first bracket 22 are inserted into the same recess (the second recess 49b of the second bracket 32). In the first bracket 22, the first recess 48a is formed between the first protrusion 44a and the second protrusion 45a, and the third recess 50a is formed between the third protrusion 46a and the fourth protrusion 47a. Each of the first recess 48a and the third recess 50a of the first bracket 22 functions as a fastening recess into which a bolt B is inserted. The first protrusion 44a and the second protrusion 45a of the first bracket 22 function as a first insertion protruding section and a second insertion protruding section, respectively, that form a fastening recess between one another. In a similar manner, the third protrusion 46a and the fourth protrusion 47a of the first bracket 22 function as a first insertion protruding section and a second insertion protruding section, respectively, that form a fastening recess between one other.

The set of the first protrusion 44b and the second protrusion 45b of the second bracket 32 that functions as a single insertion protrusion is inserted into the fourth recess 51a of the first bracket 22. The set of the third protrusion 46b and the fourth protrusion 47b of the second bracket 32 that functions as a single insertion protrusion is inserted into the second recess 49a of the first bracket 22. That is, the first protrusion 44b and the second protrusion 45b of the second bracket 32 are inserted into the same recess (the fourth recess 51a of the first bracket 22), and the third protrusion 46b and the fourth protrusion 47b of the second bracket 32 are inserted into the same recess (the second recess 49a of the first bracket 22). In the second bracket 32, the first recess 48b is formed between the first protrusion 44b and the second protrusion 45b, and the third recess 50b is formed between the third protrusion 46b and the fourth protrusion 47b. Each of the first recess 48b and the third recess 50b of the second bracket 32 functions as a fastening recess into which a bolt B is inserted. The first protrusion 44b and the second protrusion 45b of the second bracket 32 function as a first insertion protruding section and a second insertion protruding section, respectively, that form a fastening recess between one another. In a similar manner, the third protrusion 46b and the fourth protrusion 47b of the second bracket 32 function as a first insertion protruding section and a second insertion protruding section, respectively, that form a fastening recess between one another.

A bracket 100 of a comparative example will now be described.

Figure 4:
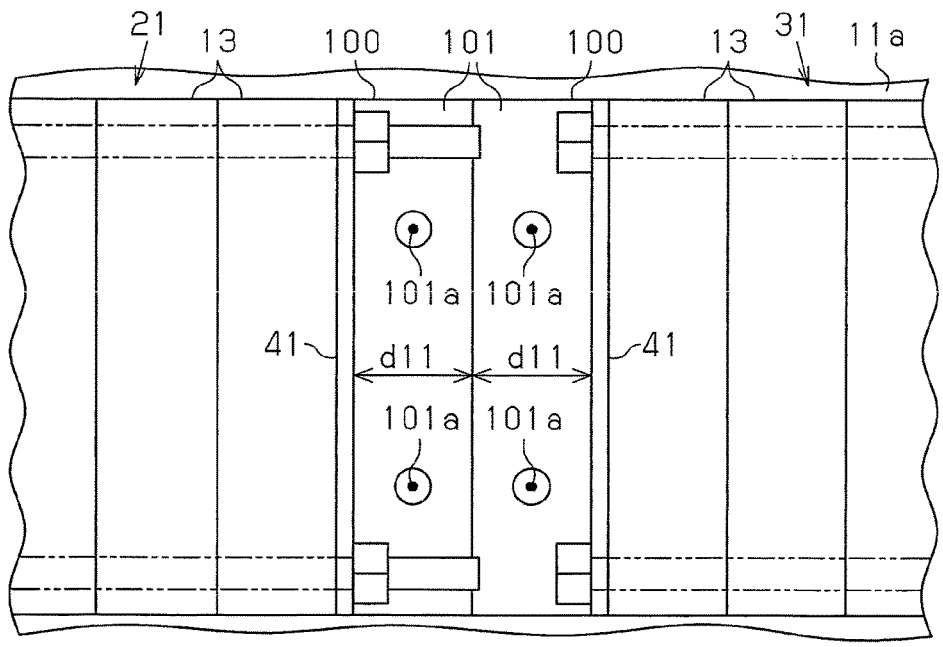
FIG. 4 is an enlarged view showing a first bracket and a second bracket of a comparative example.

As shown in FIG. 4, the bracket 100 of the comparative example includes a fastening portion 101 having the shape of a flat rectangular plate. The fastening portion 101 does not include the protrusions 44 to 47 or the recesses 48 to 51 shown in FIG. 2. The fastening portion 101 has a transverse dimension d11 that is equal to the transverse dimension d10 of the fastening portions 43a and 43b of the first bracket 22 and the second bracket 32 of the embodiment (the dimension between the proximal ends of the fastening portion 43a and 43b that are connected to the fixing portion 41a and 41b and the distal ends of the protrusions 44a to 47a and 44b to 47b). Thus, in the battery module 16, the dimension of the brackets 100 of the comparative example in the arrangement direction of the first battery stack 21 and the second battery stack 31 is twice as long as the dimension d10 (dimension d11). In addition, the fastening portion 101 includes insertion holes 101a into which bolts are inserted.

Operation of the battery pack 10 of the present embodiment will now be described.

As shown in FIG. 3, the first protrusion 44a and the second protrusion 45a of the first bracket 22 are inserted into the fourth recess 51b of the second bracket 32, and the third protrusion 46a and the fourth protrusion 47a are inserted into the second recess 49b of the second bracket 32. Further, the first protrusion 44b and the second protrusion 45b of the second bracket 32 are inserted into the fourth recess 51a of the first bracket 22, and the third protrusion 46b and the fourth protrusion 47b are inserted into the second recess 49a of the first bracket 22. The first bracket 22 and the second bracket 32 include portions that overlap one another in the transverse direction of the fastening portions 43a and 43b. Specifically, the first protrusion 44a and the second protrusion 45a of the first bracket 22 overlap with the fourth recess 51b of the second bracket 32, and the third protrusion 46a and the fourth protrusion 47a of the first bracket 22 overlap with the second recess 49b of the second bracket 32. In the similar manner, the first protrusion 44b and the second protrusion 45b of the second bracket 32 overlap with the fourth recess 51a of the first bracket 22, and the third protrusion 46b and the fourth protrusion 47b of the second bracket 32 overlap with the second recess 49a of the first bracket 22. Thus, compared to the structure that uses the brackets 100 of the comparison example, the length of the battery module 16 in the arrangement direction of the rectangular batteries 12 is reduced by a dimension d20 of the portions in which the fastening portions 43a and 43b of the brackets 22 and 32 overlap one another, in other words, the dimension d20 of the first protrusions 44a and 44b and the second protrusions 45a and 45b that are inserted into the fourth recesses 51a and 51b (or the dimension of the third protrusions 46a and 46b and the fourth protrusions 47a and 47b that are inserted into the second recesses 49a and 49b). That is, the length of the first bracket 22 and the second bracket 32 in the battery module 16 in the arrangement direction of the first battery stack 21 and the second battery stack 31 is the length obtained by subtracting the dimension d20 from twice the length of the dimension d10.

In addition, the second protrusion 45a of the first bracket 22 is in engagement with the fourth recess 51b of the second bracket 32, and the third protrusion 46a and the fourth protrusion 47a of the first bracket 22 are in engagement with the second recess 49b of the second bracket 32. Further, the second protrusion 45b of the second bracket 32 is in engagement with the fourth recess 51a of the first bracket 22, and the third protrusion 46b and the fourth protrusion 47b of the second bracket 32 are in engagement with the second recess 49a of the first bracket 22. Thus, even when the bolts B are loosened, for example, movement of the first battery stack 21 and the second battery stack 31 in the longitudinal direction of the fastening portion 43 is limited.

The above described embodiment has the following advantages.

(1) In the fastening portion 43a of the first bracket 22 of the first battery stack 21, the first to fourth protrusions 44a to 47a and the first to fourth recesses 48a to 51a are formed alternately. In the fastening portion 43b of the second bracket 32 of the second battery stack 31, the first to fourth protrusion 44b to 47b and the first to fourth recesses 48b to 51b are formed alternately. The first to fourth protrusions 44a to 47a of the first bracket 22 are inserted into the second recess 49b or the fourth recess 51b of the second bracket 32. The first to fourth protrusions 44b to 47b of the second bracket 32 are inserted into the second recess 49a or the fourth recess 51a of the first bracket 22. Thus, compared to the brackets 100 of the comparative example, the length of the first battery stack 21 and the second battery stack 31 in the arrangement direction is reduced, thereby reducing the size of the battery module 16.

(2) The first to fourth protrusions 44a to 47a are in engagement with the second recess 49b or the fourth recess 51a, and the first to fourth protrusions 44b to 47b are in engagement with the second recess 49a or the fourth recess 51a. This limits movement of the first battery stack 21 and the second battery stack 31 in the longitudinal direction of the fastening portions 43a and 43b. Accordingly, positional deviation of the first battery stack 21 and the second battery stack 31 is limited.

(3) The first bracket 22 and the second bracket 32 are the same brackets 15. Thus, a common component is used as the first bracket 22 and the second bracket 32, reducing the number of components.

(4) In the fastening portion 43a of the first bracket 22, the first longitudinal end 221 includes the fourth recess 51a, and the second longitudinal end 222 includes the first protrusion 44a. In the fastening portion 43b of the second bracket 32, the first longitudinal end 321 includes the first protrusion 44b, and the second longitudinal end 322 includes the fourth recess 51b. Accordingly, the first bracket 22 and the second bracket 32 are arranged such that the protrusions 44a to 47a and the recesses 48a to 51a of the first bracket 22 are arranged in the opposite order to the protrusion 44b to 47b and the recesses 48b to 51b of the second bracket 32. This allows for insertion of the first to fourth protrusions 44a to 47a of the first bracket 22 into the opposite second recess 49b or the fourth recess 51b of the second bracket 32 and insertion of the first to fourth protrusions 44b to 47b of the second bracket 32 into the opposite second recess 49a or the fourth recess 51b of the first bracket 22.

(5) The first recesses 48a and 48b and the third recesses 50a and 50b, which receive bolts B, extend from one end toward the other in the transvers direction of the fastening portion 43. Thus, even if there is dimensional deviation in the first battery stack 21 or the second battery stack 31, the bolts B can be easily fastened to the housing 11.

The embodiment may be modified as follows.

Figure 5:
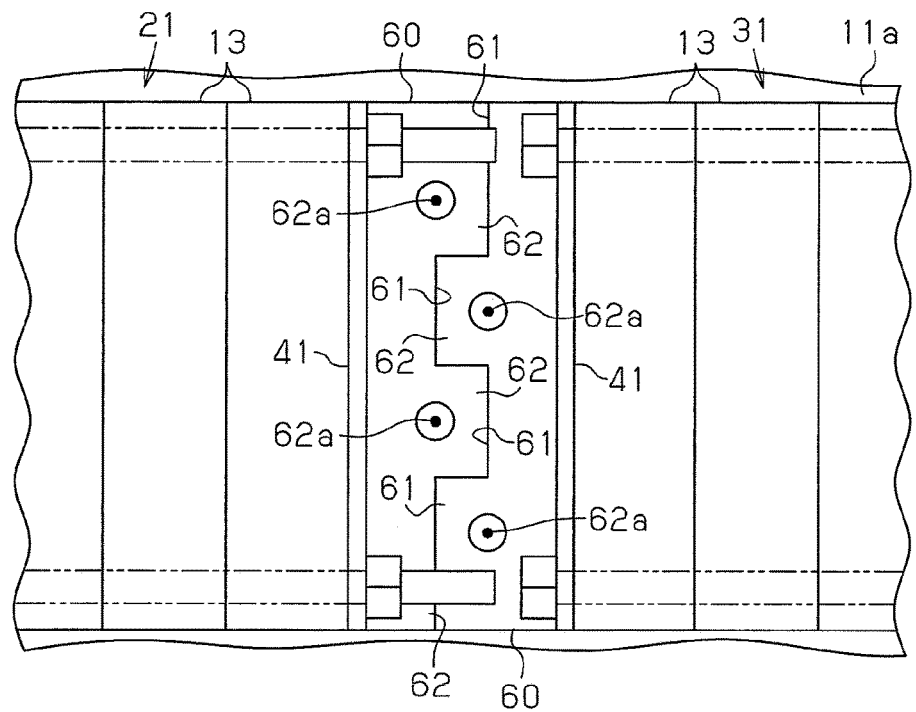
FIG. 5 is an enlarged view showing a first bracket and a second bracket of a modification.

As shown in FIG. 5, each of the first bracket and the second bracket may be a bracket 60, in which, instead of fastening recesses, reception recesses 61 and insertion protrusions 62 are formed alternately. In this case, each insertion protrusion 62 may include an through hole 62a in place of a fastening recess. A bolt B may be inserted into the through hole 62a and threaded to the housing 11.

Figure 6:
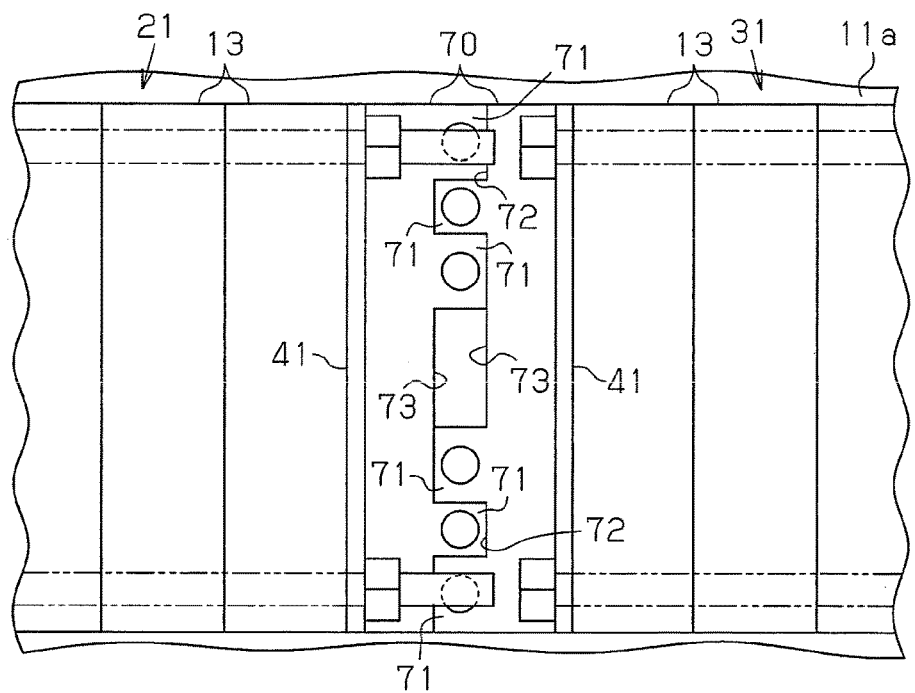
FIG. 6 is an enlarged view showing a first bracket and a second bracket of another modification.

As shown in FIG. 6, each of the first bracket and the second bracket may be a bracket 70, which includes a plurality of insertion protrusions 71 and a plurality of reception recesses 72 and 73. The dimension of the reception recesses 73 in the longitudinal direction of the fastening portion 43 may be greater than the dimension of the insertion protrusions 71 in the longitudinal direction of the fastening portion 43. Each reception recess 73 includes a first end and a second end in the longitudinal direction of the fastening portion 43. The first end is in contact with an end of the insertion protrusion 71 that is inserted into the reception recess 73, and the second end is not in contact with the insertion protrusion 71.

Cylindrical batteries or laminated batteries may be used as rechargeable batteries.

In the embodiment, the first longitudinal end 221 (a secondary end) of the fastening portion 43a of the first bracket 22 includes the fourth recess 51a, and the second longitudinal end 222 (a primary end) includes the first protrusion 44a. However, the present invention is not limited to such a structure. For example, each of the first longitudinal end 221 and the second longitudinal end 222 of the fastening portion 43a of the first bracket 22 may include a protrusion. In this case, each of the first longitudinal end 321 and the second longitudinal end 322 of the fastening portion 43b of the second bracket 32 includes a recess. Alternatively, each of the first longitudinal end 221 and the second longitudinal end 222 of the fastening portion 43a of the first bracket 22 may include a recess. In this case, each of the first longitudinal end 321 and the second longitudinal end 322 of the fastening portion 43b of the second bracket 32 includes a protrusion.

Three of more battery stacks may be arranged. In this case, the size of the battery pack 10 can be reduced by arranging the first bracket 22 and the second bracket 32 at the adjacent ends of the battery stacks.

The brackets 15 that are located at the end of the first battery stack 21 that faces away from the second battery stack 31 and at the end of the second battery stack 31 that faces away from the first battery stack 21 may have any shapes. For example, those brackets do not have to include the fastening portion 43 or the fixing portion 41. Further, the bracket 15 does not have to be placed at the end of the first battery stack 21 that faces away from the second battery stack 31 or at the end of the second battery stack 31 that faces away from the first battery stack 21.

What is claimed is:

1. A battery pack comprising:
a coupled member; and
a battery module coupled to the coupled member, wherein the battery module includes:
   a first battery stack and a second battery stack, each including a plurality of rechargeable batteries, wherein the first battery stack includes an end that is adjacent to the second battery stack, and the second battery stack includes an end that is adjacent to the first battery stack;
   a first bracket that is located at the end of the first battery stack; and
   a second bracket that is located at the end of the second battery stack and identical in shape with the first bracket,
   each of the first bracket and the second bracket includes insertion protrusions and reception recesses that are arranged alternately,
   at least one of the insertion protrusions of the second bracket is inserted into at least one of the reception recesses that is formed between two adjacent ones of the insertion protrusions of the first bracket,
   the first and second brackets are configured to couple the first and second battery stacks to the coupled member via the insertion protrusions,
   each of the first bracket and the second bracket includes a fixing portion fixed to the end of the corresponding one of the first and second battery stacks, and
   the insertion protrusions of the first bracket protrude from a side edge of the fixing portion of the first bracket toward the second bracket, and the insertion protrusions of the second bracket protrude from a side edge of the fixing portion of the second bracket toward the first bracket.

2. The battery pack according to claim 1, wherein
the insertion protrusions and the reception recesses of each bracket are arranged along the side edge of the fixing portion of the corresponding bracket,
each of the first bracket and the second bracket includes a primary end and a secondary end in an arrangement direction of the insertion protrusions and the reception recesses,
at least one of the insertion protrusions is formed in the primary end of each bracket,
at least one of the reception recesses is formed in the secondary end of each bracket, and
the first and second brackets are arranged such that the insertion protrusion formed in the primary end of the first bracket faces the reception recess formed in the secondary end of the second bracket.

3. The battery pack according to claim 1 further comprising:
a fastener for coupling the battery module to the coupled member, wherein
each insertion protrusion of each bracket includes a first insertion protruding section and a second insertion protruding section that are inserted into a common one of the reception recesses of the other one of the brackets, and
a fastening recess into which the fastener is inserted is formed between the first insertion protruding section and the second insertion protruding section.

4. A battery pack comprising:
a coupled member; and
a battery module coupled to the coupled member, wherein the battery module includes:
   a first battery stack and a second battery stack, each including a plurality of batteries arranged in a first direction, wherein the first battery stack includes an end that is adjacent to the second battery stack, and the second battery stack includes an end that is adjacent to the first battery stack;
   a first bracket that is located at the end of the first battery stack; and
   a second bracket that is located at the end of the second battery stack,
   each of the first bracket and the second bracket includes protrusions,
   the protrusions of the first bracket and the protrusions of the second bracket are arranged alternately in a second direction substantially perpendicular to the first direction, the first and second brackets are configured to couple the first and second battery stacks to the coupled member via the protrusions, each of the first bracket and the second bracket includes a fixing portion fixed to the end of the corresponding one of the first and second battery stacks, the fixing portion includes a side edge extending in the second direction, and the protrusions of the first bracket protrude from the side edge of the fixing portion of the first bracket toward the second bracket in the first direction, and the protrusions of the second bracket protrude from the side edge of the fixing portion of the second bracket toward the first bracket in the first direction.

5. The battery pack according to claim 4, wherein at least one of the protrusions of one of the first and second brackets is provided between two adjacent protrusions of the other one of the first and second the brackets.

6. The battery pack according to claim 4, wherein the protrusions of the first bracket and the protrusions of the second bracket are located at a same location in a third direction substantially perpendicular to the first and second directions.

7. The battery pack according to claim 4, wherein each protrusion has an opening into which a fastener is inserted for coupling the battery module to the coupled member.

8. The battery pack according to claim 4, wherein the first and second brackets are identical in shape.

9. The battery pack according to claim 1, wherein each of the insertion protrusions has an opening into which a fastener is inserted for coupling the battery module to the coupled member.

10. The battery pack according to claim 1, wherein the insertion protrusions and the reception recesses of each bracket are arranged along the side edge of the fixing portion of the corresponding bracket.

11. The battery pack according to claim 4, wherein the protrusions of each bracket are arranged along the side edge of the fixing portion of the corresponding bracket.

12. A battery module comprising:

a first battery stack and a second battery stack, each including a plurality of batteries arranged in a first direction, wherein the first battery stack includes an end that is adjacent to the second battery stack, and the second battery stack includes an end that is adjacent to the first battery stack;

a first bracket that is located at the end of the first battery stack; and a second bracket that is located at the end of the second battery stack, wherein each of the first bracket and the second bracket includes:
  a fixing portion that is fixed to the end of the corresponding one of the first and second battery stacks and has a side edge extending in a second direction substantially perpendicular to the first direction, and
  a plurality of protrusions that are arranged only along the side edge of the fixing portion and protrude only from the side edge toward the other one of the first and second brackets, and at least one of the protrusions of each of the first and second brackets is provided between two adjacent protrusions of the other one of the first and second the brackets.

13. The battery module according to claim 12, wherein each of the first and second brackets is substantially L-shaped as viewed in the second direction.

* * * * *